Patented May 5, 1925.

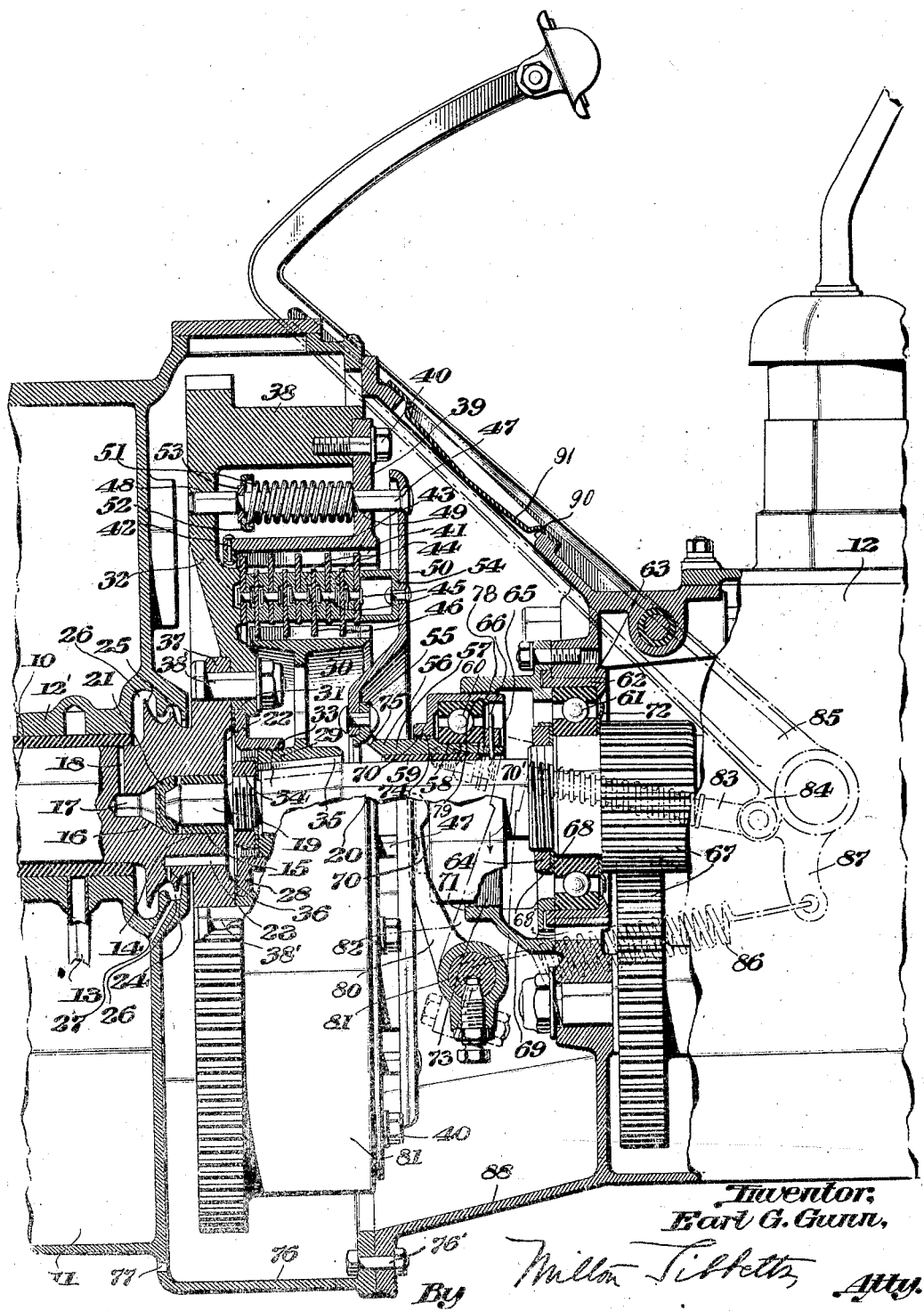

1,536,339

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

POWER-TRANSMISSION MECHANISM.

Application filed July 8, 1920. Serial No. 394,673.

*To all whom it may concern:*

Be it known that I, EARL G. GUNN, a citizen of the United States, and resident of Detroit, Wayne County, State of Michigan, have invented certain new and useful Improvements in Power-Transmission Mechanism, of which the following is a specification.

This invention relates to power transmission mechanisms for motor vehicles and more particularly to the clutch mechanism and associated parts.

The object of the invention is to provide a structure that will be compact, and that may be easily and quickly assembled and taken apart.

Another object of the invention is to effectively lubricate the parts of a friction clutch requiring lubrication and at the same time to confine the oil or lubricant to the parts needing lubrication, and to prevent them from coming into contact with the friction surfaces of the clutch.

Further objects will appear from the following description taken in connection with the drawing which forms a part of this specification, and in which one embodiment of the invention is illustrated partly in section and partly in elevation.

As illustrated in the drawing, the clutch mechanism is mounted between the end of the crankshaft 10 carried by the crankcase 11 and the transmission case 12. The crankshaft 10 is journaled in suitable bearings in the crankcase, a bearing 12′ at one end of the crankshaft being illustrated and this bearing receiving lubricating oil through a conduit 13, which, in turn, is connected to any suitable oil pressure system. The end of the crankshaft is recessed, as shown at 14, this recess having a cylindrical portion 15 and a conical portion 16, the latter portion opening into a second cylindrical portion 17 which is reduced in section.

A radial opening 18 receives oil from the crankshaft bearing and conducts this oil into the portion 17 of the recessed end of the crankshaft, the oil passing from this portion into the conical portion 16 and thence into the cylindrical portion 15 of the end of the crankshaft, the latter portion forming a bearing for the reduced end 19 of the transmission shaft 20 hereinafter described. A packing member 21, which may be formed of felt or other suitable material, is positioned in the conical portion 16 of the recessed end of the crankshaft in order to limit the amount of lubricant passing to the bearing for the portion 19 of the transmission shaft.

In order to confine the oil by means of which the bearing above described is lubricated, the end of the crankshaft shown in the drawing is cut away, as indicated at 22, this cut-away portion opening into a longitudinally disposed opening 23, which, in turn, opens at its opposite end into a radially formed aperture 24. The crankshaft is also provided with outwardly extending oil throw-off rings 25, these rings extending into pockets 26 formed in the crankcase. In order to conduct the oil from the pockets 26 back into the crankcase, the latter is provided with an inclined opening 27 which leads from the lower portion of one of the pockets downwardly into the crankcase.

In order to confine the lubricant in the cut-away portion 22 of the crankshaft, an outwardly flanged collar 28 is clamped between the rear face of a flange 37 at the end of the crank shaft 10 and a flywheel 32, this collar extending over the hub portion 29 of a clutch spider 30 hereinafter described, and being provided with interior threads spiraled in a direction to feed the oil towards the left in the drawing or back into the space 22. The hub portion 29 has a sliding or loose fit in the collar 28 so that it may be readily withdrawn therefrom in taking the clutch apart.

The interior of the hub 29 of the clutch spider 30 is frusto-conical in shape, this hub being mounted on a correspondingly formed portion 33 of the shaft 20, the hub being secured to the shaft by means of a nut 34 and being secured against rotation by a key 35.

The flywheel 32 is secured to the flange 37 formed on the crankshaft by means of bolts 38′; these bolts clamping the flange and the collar 28 in place, with a washer 36 between them, as clearly shown in the drawing. At its outer periphery the flywheel 32 has formed thereon a flange 38 which extends laterally from the main portion of the flywheel, and has secured thereto a cover member or casing 39 by means of bolts 40. The member 39 is L-shaped in section, the portion of this member extending parallel to the axis of the clutch having formed therein a plurality of inwardly extending ribs or teeth 41. This portion of the member 39 has also secured to one end a ring 42, the purpose of which will be hereinafter set forth. A plurality of clutch rings 43 is disposed within the longitudinal portion of the member 39, these rings being provided with offset portions or teeth which mesh with the teeth 41 formed on the member 39 in a manner well-known in the art. Suitable friction rings 44 are secured by rivets 45, or in some other suitable manner, to the rings 43, and these friction elements engage and are positioned on opposite sides of clutch rings 46 carried by the outer peripheral portion of the clutch spider 30, and having intermeshing engagement with the spider in a manner similar to that above described with respect to the member 39 and rings 43.

In the type of clutch illustrated, the clutch rings are held in operative or power transmitting position by resilient means, and suitable mechanism under the control of the operator is provided for releasing these members from operative engagement.

In order to make the clutch mechanism compact in construction, the resilient clutch actuating members are disposed in the recessed portion of the flywheel formed by the peripheral flange 38 and the casing or cover portion 39. These members comprise a plurality of pins 47 slidably mounted, as shown at 48, in the body portion of the flywheel, and extending through suitable apertures 49 formed in the cover portion or casing 39. These pins are carried by a presser plate 50 and are encircled by coil springs 51, the latter being positioned between the member 39 and flanged collars 52 secured to the pins by split washers 53. The presser plate 50 is provided with an outwardly extending channel member 54, which is adapted to engage the clutch rings above described and force these members into operative engagement with each other. The presser plate 50 is carried by a flange 55 formed on a clutch shifting member 56, the latter having a sleeve 57 cut away at one end, as shown at 58, the sleeve being mounted on a bushing 59 carried by the transmission shaft 20. A ball thrust bearing 60 is mounted on the recessed or cut-away portion 58 of the sleeve 57, and means is provided for lubricating the ball thrust bearing 60 and an anti-friction bearing 61 for the transmission shaft, the latter bearing being disposed in a flanged collar 62, which, in turn, is mounted in an end wall 63 of the transmission case 12. The anti-friction bearing 61 is secured in position by means of a nut 64 threaded onto the shaft 20, and the thrust bearing 60 is secured in place by a nut 65 threaded onto the sleeve 57 of the clutch shifting member, a cotter pin 66 securing the nut 65 against turning.

In the present instance the bearings 60 and 61 are lubricated by oil forced from the transmission case 12 by means of the intermeshing transmission gears 67, this oil being forced through the bearing 61 into a pocket 68 formed between a casing member 69 and the shaft 20, the casing 69 also securing the collar 62 and the bearing 61 to the transmission case 12, and extending over a portion of a casing member 70 for the bearing 60, as shown at 71.

Means is provided for limiting the amount of lubricant fed from the transmission case through the bearing 61, this means comprising a baffle ring 72 which is positioned at one side of the bearing 61 and between the bearing and one of the gears 67. A passage 68' forms means for conducting the lubricant back into the transmission case.

In order to prevent the oil from escaping over the outer surface of the casing 70, the portion 71 of casing 69 is provided with inwardly extending alternating spiral ribs and grooves 73, the ribs extending into close proximity to but not engaging the outer surface of casing 70, and being threaded in a direction to feed the oil towards the right or into the casing 69, the casing 70 turning in the direction indicated by the arrow 70'. Means is also provided for confining the lubricant within the casing 70 and preventing its escape between this casing and the sleeve 57, this means comprising a plurality of alternating spiral ribs and grooves 74 (similar to ribs and grooves 73) which are so formed as to feed back into the casing any oil which tends to flow outwardly therefrom. Oil that escapes from the bushing 59 will be prevented from getting to the clutch rings by one or more openings 75 formed in the sleeve 57. Any oil passing through these openings will fall by gravity into the lower portion 76 of the crankcase extension or into extension 88 of the transmission case 12, and may pass outwardly therefrom through suitable openings 77. The extensions 76 and 88 of the crankcase and transmission case are connected by suitable bolts 76'.

An expansion ring 78 engages a groove 79 formed in the casing 70 adjacent the bearing 60 and retains this bearing against endwise movement, and also retains the casing 70 in position. The clutch shifting member 56 may be actuated in any suitable manner, and in the embodiment of the invention shown, this member is actuated by a yoke 80 carried by a rock shaft 81; this rock shaft having also secured thereto an arm 82 which is adapted to be rotated with the rock shaft by means of a link 83, engaging at one end the arm 82 and pivoted at its opposite end to an offset portion 84 of a foot lever 85. A spring 86 is provided for returning the yoke and pedal to normal position, this spring being secured at one end to an offset portion 87 of the pedal 85 and at its opposite end to the rock shaft 81.

From the foregoing description, it will be seen that I have provided effective means for lubricating the rotating and operative parts of clutch mechanism, and for disposing of the excess oil. As the lubricating system and the path of the oil have already been explained in detail, further description seems unnecessary.

Particular attention is, however, directed to the manner in which the clutch mechanism may be taken apart. In the upper wall of the extension 88 is a hand opening 90 over which is a removable cover 91. By removing this cover the bolts 40 are accessible, the flywheel being turned as desired to bring the bolts to the top near the opening. After the bolts 40 have been removed the bolts 76' are taken out, thus disconnecting the crank case from the transmission case and these two cases may then be separated and all of the clutch parts including the shaft 20 withdrawn from the flywheel. As the casing 39 is withdrawn in this manner, the ring 42 carried by this casing will engage the end clutch ring 43, and will withdraw the rings 43 and 46 and the friction elements 44 with the other members above mentioned. Removal of the bolt 34 on the shaft 20 will then permit further disassembly.

Although one specific embodiment of the invention has been described, it should be understood that the invention is capable of modification and that changes in the construction and arrangement of the various cooperating parts may be made without departing from the spirit or scope of the invention as expressed in the following claims.

What I claim and desire to secure by Letters Patent is:—

1. In a clutch mechanism, the combination of a two-part driving member, means detachably connecting the parts together, a driven member, means disposed between said clutch members for transmitting motion from one to the other, spring means independent of the driven member for operating said motion transmitting means, said motion transmitting means engaging one of said driving parts independently of the means connecting said driving parts together, and said driven member, said motion transmitting means and the part of said driving member which engages said motion transmitting means, being removable as a unit from the other part of said driving member.

2. In combination, a driving element, a clutch member secured thereto, a cover member, means for securing said cover member to said clutch member, a second clutch member, means disposed between said clutch members for transmitting motion from one to the other, said means engaging said cover member independently of said securing means, and means carried by said cover member independently of said second clutch member for moving said motion transmitting means to operative position, said cover member, clutch operating means and motion transmitting means being removable as a unit from said first named clutch member.

3. In combination, clutch mechanism comprising a flywheel, a casing secured thereto, a clutch member disposed within said flywheel, means disposed between said clutch member and said casing for transmitting motion from one to the other, said means engaging said casing independently of the latter's attachment to the flywheel, and means carried by the casing independently of said clutch member for actuating said motion transmitting means into operative position, said casing, motion transmitting means and actuating means being removable from the flywheel as a unit.

4. Clutch mechanism comprising in combination a flywheel having a peripheral flange, a casing secured to said flange and having a part extending within the flange, a clutch spider disposed within said flywheel, motion transmitting members between said spider and said casing, means for moving said motion transmitting members to operative position, and including a presser plate and a plurality of springs disposed within said casing and operatively connected with said presser plate, said casing, motion transmitting members, presser plate and presser plate actuating springs being removable as a unit from said flywheel.

5. Clutch mechanism comprising in combination a clutch member having a peripheral flange and including a casing secured to said flange, a second clutch member, motion transmitting means between said first clutch member and said second clutch member, a presser plate, a plurality of pins slidably mounted in said first clutch member, extending through said casing and engaging said presser plate, a spring surrounding and actuating each of said pins and disposed within said casing, and a channel member carried by said presser plate and engaging said motion transmitting means.

6. Clutch mechanism comprising in combination a pair of clutch members, means including a thrust bearing for actuating said members toward and away from each other, means for lubricating said thrust bearing, a casing partially surrounding said bearing, and spiral grooved means carried by said casing for preventing the escape of lubricant from said bearing.

7. In a clutch mechanism, the combination of a flywheel having a peripheral flange, a casing detachably secured to said flange and having a part extending within the flange, a clutch spider disposed within the casing flange, motion transmitting members between said spider and the flange of said casing, and mechanical means independent of the clutch spider for moving said motion transmitting members to operative position.

8. In combination, a transmission case, a transmission shaft having a bearing therein, a clutch member secured to said shaft, clutch shifting mechanism including a thrust bearing, means for conducting lubricant from said case to said shaft bearing and from said shaft bearing to said thrust bearing, and means secured to said transmission case and surrounding said thrust bearing for confining the lubricant thereto.

9. In combination, a transmission case, a transmission shaft journaled therein, a clutch member secured to said shaft, clutch shifting mechanism including a thrust bearing, means for conducting lubricant from said transmission case to said thrust bearing, spiral grooved means surrounding said thrust bearing for preventing the escape of lubricant, and means for conducting lubricant from said last named means back into the transmission case.

10. Clutch mechanism comprising in combination a pair of clutch members, a casing surrounding said clutch members, a transmission shaft, and a clutch shifting member mounted thereon and having a sleeve, said sleeve having means for conducting oil from its inner surface back into the casing.

11. In combination, a crankcase, a drive shaft journaled therein, a driven shaft having a bearing in said drive shaft, clutch members carried respectively by said shafts, and means for conducting a limited amount of oil from the bearing of said drive shaft to the bearing of said driven shaft.

12. In combination, a crankcase, a drive shaft journaled therein, a driven shaft having a bearing in said drive shaft, means for conducting the oil from the bearing of said drive shaft to the bearing of said driven shaft, and means for returning oil to the crankcase from the driven shaft bearing.

13. In combination, a crankcase, a drive shaft journaled therein, a driven shaft having a bearing in one end of said drive shaft, clutch members carried respectively by said shafts, means for conducting lubricant from the bearing of said drive shaft to the bearing of said driven shaft, and a packing member mounted in said drive shaft for limiting the amount of lubricant passing to said driven shaft bearing.

14. In a clutch mechanism, the combination of a two-part driving member one of which parts has clutch ring teeth, means detachably connecting the parts of said driving member rigidly together, a driven member having clutch ring teeth, clutch rings disposed between said clutch members for transmitting motion from one to the other and having sliding engagement with the teeth of said members, and mechanical means independent of the driven member, for operating said clutch rings.

15. In a clutch mechanism, the combination of a two-part driving member one of which parts has clutch ring teeth, means detachably connecting the parts of said driving member together, a driven member having clutch ring teeth, clutch rings disposed between said clutch members for transmitting motion from one to the other and having sliding engagement with the teeth of said members, and mechanical means independent of the driven member for operating said clutch rings, said clutch rings and the toothed part of said driving member being removable as a unit from the other part of said driving member.

16. In a clutch mechanism, the combination of a two-part driving member having its parts detachably and rigidly connected together and each having parts extending parallel of the clutch axis, said parts being radially separated from each other forming an annular space therebetween, a driven member having a similarly extending part and arranged radially inward of the other member, motion transmitting means between the inner part of the driving member and the driven member, springs for operating the transmitting means and arranged in said annular space, and connections from said springs to said transmitting means.

17. In a clutch mechanism, the combination of a two-part driving member each having parts extending parallel of the clutch axis, said parts being radially separated from each other forming an annular space therebetween, a driven member having a similarly extending part and arranged radially inward of the other member, motion transmitting means between the inner part of the driving member and the driven member, springs for operating the transmitting means and arranged in said annular space, a pressure plate acting against said transmitting means, and pins connecting said springs and said plate.

In testimony whereof I affix my signature.

EARL G. GUNN.